United States Patent
Moore, Jr. et al.

(10) Patent No.: US 10,701,420 B2
(45) Date of Patent: Jun. 30, 2020

(54) VEHICLE-TO-VEHICLE MEDIA DATA CONTROL

(71) Applicant: INTERNATIONAL BUSINESS MACHINES CORPORATION, Armonk, NY (US)

(72) Inventors: John E. Moore, Jr., Pflugerville, TX (US); Andrew R. Jones, Round Rock, TX (US); Charles S. Lingafelt, Durham, NC (US); Gregory J. Boss, Saginaw, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/130,310

(22) Filed: Sep. 13, 2018

(65) Prior Publication Data

US 2020/0092596 A1    Mar. 19, 2020

(51) Int. Cl.
| | |
|---|---|
| H04W 4/46 | (2018.01) |
| H04N 21/258 | (2011.01) |
| H04L 29/08 | (2006.01) |
| G06Q 50/00 | (2012.01) |

(52) U.S. Cl.
CPC ....... *H04N 21/25816* (2013.01); *H04L 67/12* (2013.01); *H04N 21/25841* (2013.01); *H04W 4/46* (2018.02); *G06Q 50/01* (2013.01)

(58) Field of Classification Search
CPC ...... H04N 21/25816; H04N 21/25841; H04W 4/46; H04W 4/38; H04W 4/40; H04W 4/48; H04L 67/12; G06Q 50/01; H04B 1/3822

USPC .......................................................... 725/25
See application file for complete search history.

(56) References Cited

U.S. PATENT DOCUMENTS

| | | | |
|---|---|---|---|
| 6,473,688 B2 | 10/2002 | Kohno et al. | |
| 8,345,098 B2 | 1/2013 | Grigsby et al. | |
| 9,043,483 B2 | 5/2015 | Grigsby et al. | |
| 2007/0063824 A1* | 3/2007 | Gaddy | G08G 1/096783 340/426.21 |
| 2009/0234859 A1 | 9/2009 | Grigsby et al. | |
| 2012/0126997 A1* | 5/2012 | Bensoussan | B60Q 1/52 340/905 |
| 2015/0199499 A1 | 7/2015 | Shaikh et al. | |
| 2017/0161973 A1* | 6/2017 | Katta | G06Q 40/08 |
| 2017/0310674 A1* | 10/2017 | Markham | B60R 16/0231 |
| 2018/0054791 A1* | 2/2018 | Pasulka | H04W 8/04 |
| 2018/0077518 A1* | 3/2018 | Nguyen | H04W 84/00 |
| 2018/0218607 A1* | 8/2018 | Baghel | G08G 1/162 |
| 2018/0365909 A1* | 12/2018 | Cheng | G07C 5/008 |
| 2018/0367731 A1* | 12/2018 | Gatti | H04N 5/23238 |
| 2018/0376307 A1* | 12/2018 | Itatsu | H04W 4/029 |
| 2019/0045244 A1* | 2/2019 | Balakrishnan | G08G 1/163 |
| 2019/0355391 A1* | 11/2019 | Zavesky | G06F 16/739 |

* cited by examiner

*Primary Examiner* — Cynthia M Fogg
(74) *Attorney, Agent, or Firm* — Griffiths & Seaton PLLC (57) ABSTRACT

Embodiments for controlling information in an internet of things (IoT) computing environment by a processor. A request may be issued for media data from one or more IoT devices associated with one or more collaborative vehicles. Approval for accessing the media data may be granted according to one or more contextual factors and user selected criteria.

17 Claims, 6 Drawing Sheets

VEHICLE-TO-VEHICLE MEDIA DATA CONTROL

BACKGROUND OF THE INVENTION

Field of the Invention

The present invention relates in general to computing systems, and more particularly to, various embodiments for using a controlling media data information in a vehicle-to-vehicle communications environment by a processor.

Description of the Related Art

In today's society, consumers, business persons, educators, and others use various computing network systems with increasing frequency in a variety of settings. For example, processing devices, with the advent and further miniaturization of integrated circuits, have made it possible to be integrated into a wide variety of devices. The advent of computers and networking technologies have made possible the increase in the quality of life while enhancing day-to-day activities. Computing systems can include an Internet of Things (IoT), which is the interconnection of computing devices scattered across the globe using the existing Internet infrastructure.

SUMMARY OF THE INVENTION

Various embodiments for controlling information in a vehicle-to-vehicle ("V2V") communications environment by a processor, are provided. In one embodiment, by way of example only, a method for controlling video information in a V2V computing environment by a processor is provided. A request may be issued for media data from one or more IoT devices associated with one or more collaborative vehicles. Approval for accessing the media data may be granted according to one or more contextual factors and user selected criteria.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

IoT devices may be embedded in a variety of physical devices or products such as, for example, in vehicles. Moreover, great advances have been achieved in communication technology such as, for example, vehicle-to-vehicle ("V2V") communication. For example, many vehicles may include various types of IoT devices such as, for example, cameras, sensors, and/or V2V communication systems each of which may use various communication operations, standards, and/or protocols (e.g., Bluetooth, Wi-Fi, near field communication "NFC", or other communication protocols or operations).

Accordingly, various embodiments of the present invention provide for controlling information in a V2V computing environment. In one aspect, the information may be media data such as, for example, audio data, video data, images, and the like capable of be delivered on demand and/or via live streaming/real-time. A request may be issued for media data from one or more IoT devices associated with one or more collaborative vehicles. Approval for accessing the media data may be granted according to one or more contextual factors and user selected criteria.

For example, the present invention provides a cognitive system for V2V communication with one or more vehicles, which may be a collaboration of vehicles, to enable data (e.g., media data such as, for example, audio, video, images, etc.) acquired from one or more IoT computing devices of a vehicle to be controlled and/or shared with one or more additional vehicles. Upon approval of the request for media data, the present invention may transmit, broadcast, stream and/or communicate media data information (e.g., live streaming, on-demand) to/from a first vehicle from/to one or more other vehicles.

As described herein, vehicular collaboration system may be employed as a "car-net" capturing one or more angles, views, and/or dimensions of the vehicle by using one or more cameras and/or sensor based devices of nearby, neighboring cars. The vehicular collaboration system may include using collaborative media data (e.g., images, video, sounds, or other sensor-based device data) via a social "car-net" through sharing of information. The collaborative data may be combined to form a 360-degree view of the vehicle capable of being displayed such as, for example, in a display system of the vehicle. Each individual vehicle of the vehicular collaboration system may control the media data shared with other vehicles.

For example, one or more vehicles, traveling behind a slower moving truck (which is obscuring the road) on a single lane roadway may seek to pass the truck by requesting access to a video stream of a defined area in front of the slow moving truck. Upon approval, the media data from the slower moving truck may be conveyed (e.g., live streamed) into each of the vehicles behind the slower moving truck to aid each of the driver's decision on when to pass the slower moving truck.

In an additional embodiment, the present invention may enable an emergency response vehicle approaching from a selected direction (e.g., approaching from the rear towards a line of other vehicles) to create a safer environment by providing and/or receiving a live video feed to or from one or more vehicles. For example, a live video feed from the emergency response vehicle may be provided to one or more alternative vehicles within a defined distance to the emergency response vehicle. Alternatively, a live video feed from one or more vehicles (e.g., a rear facing camera located on the last most vehicle closest to the approaching emergency response vehicle) may be conveyed into each of the vehicles in the line of vehicles to aid each of the driver's decision on moving aside to allow the emergency vehicle to pass.

Moreover, as an additional example, a live video feed from a side facing camera on a passing car may conveyed to into an auto assister or first responder to aid one or more actions in relation to an accident or disabled car is on a side of the highway.

Also, by way of example only, a video feed from a car traversing a road in front of a home may be conveyed to a homeowner who has left their home and unsure if a garage door was closed. The conveyed video feed may provide real-time data to the homeowner indicating whether the garage door is opened or closed.

Also, a driver may be seeking an open parking stall within a parking lot and may receive video feeds from other cars in the parking lot to aid in the search of a parking stall.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
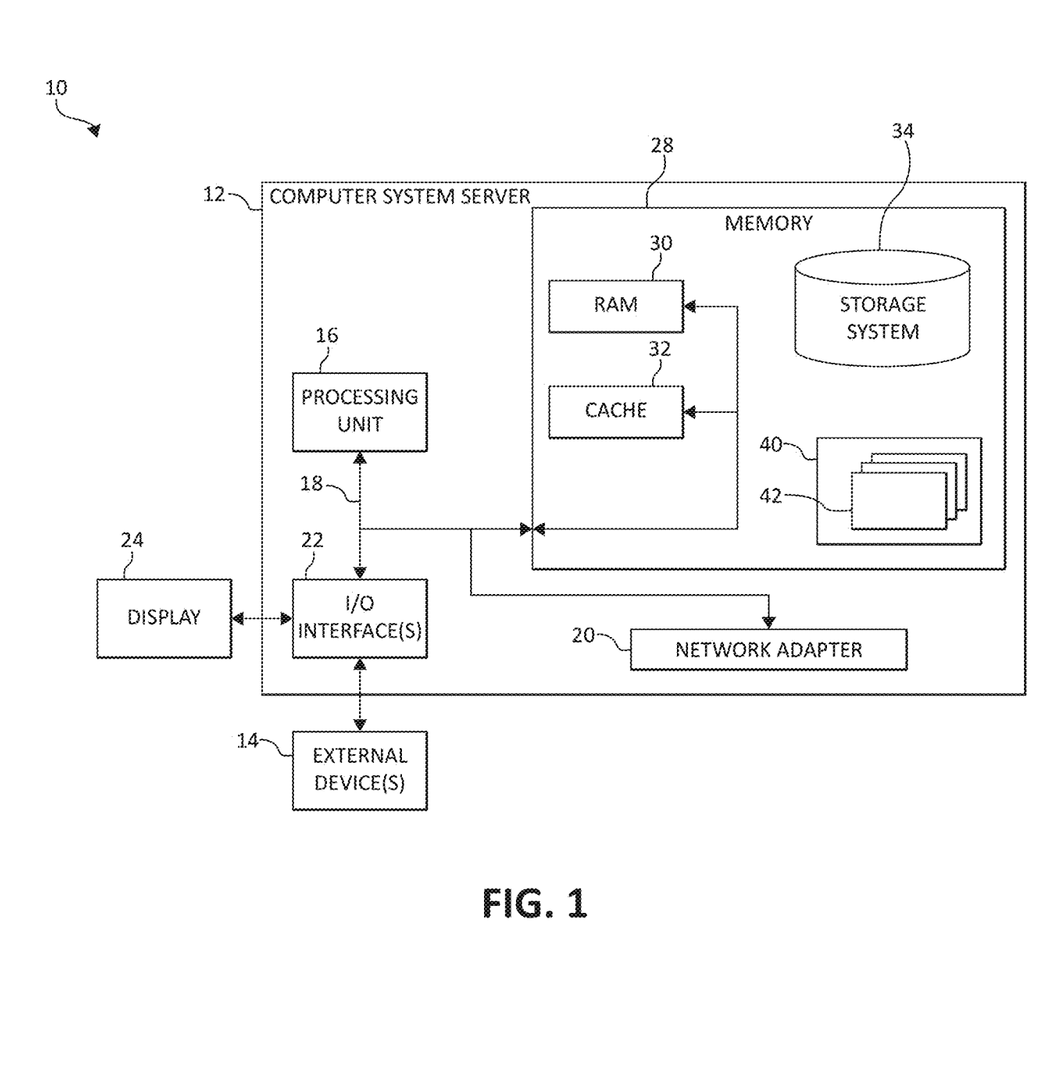
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
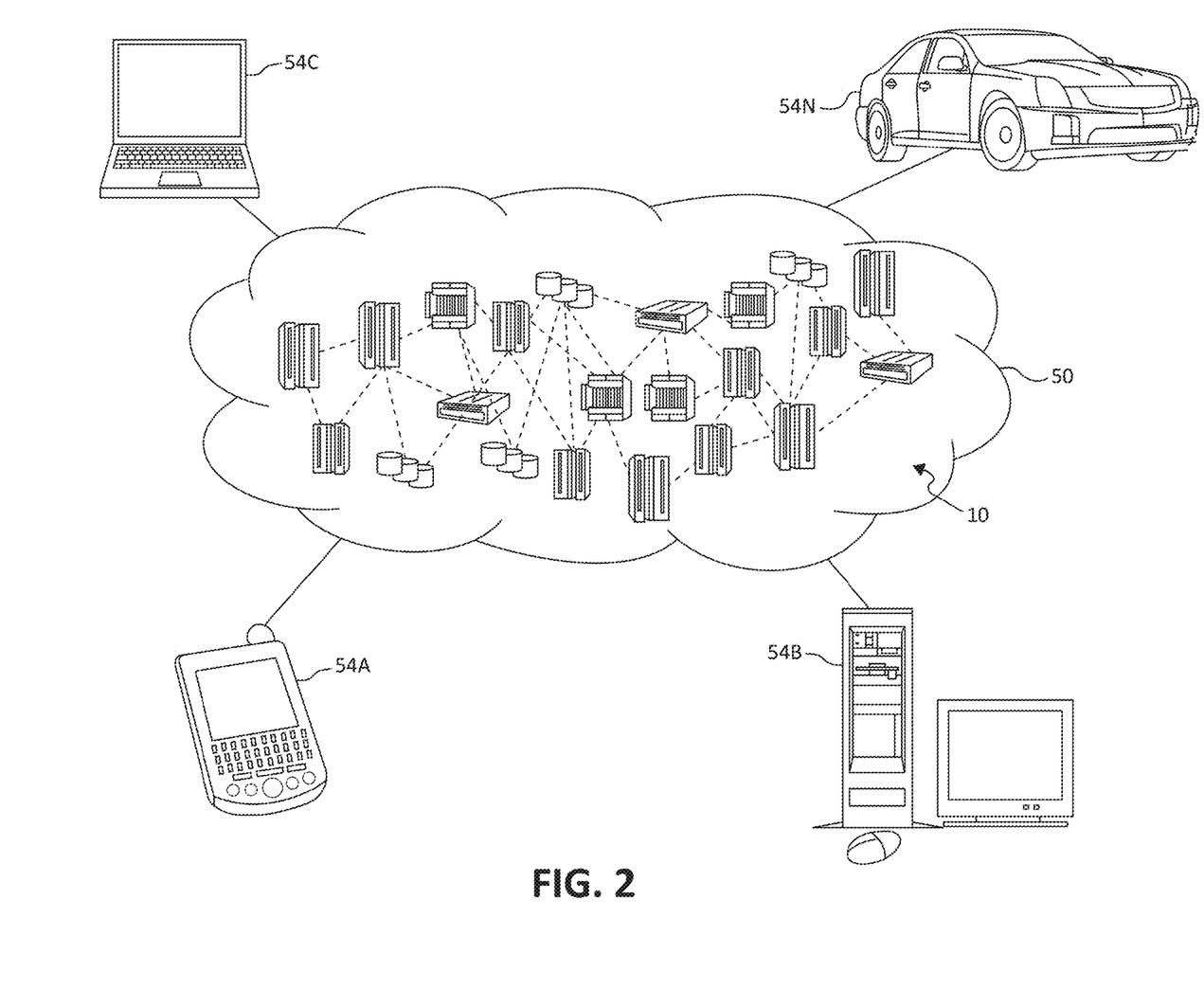
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
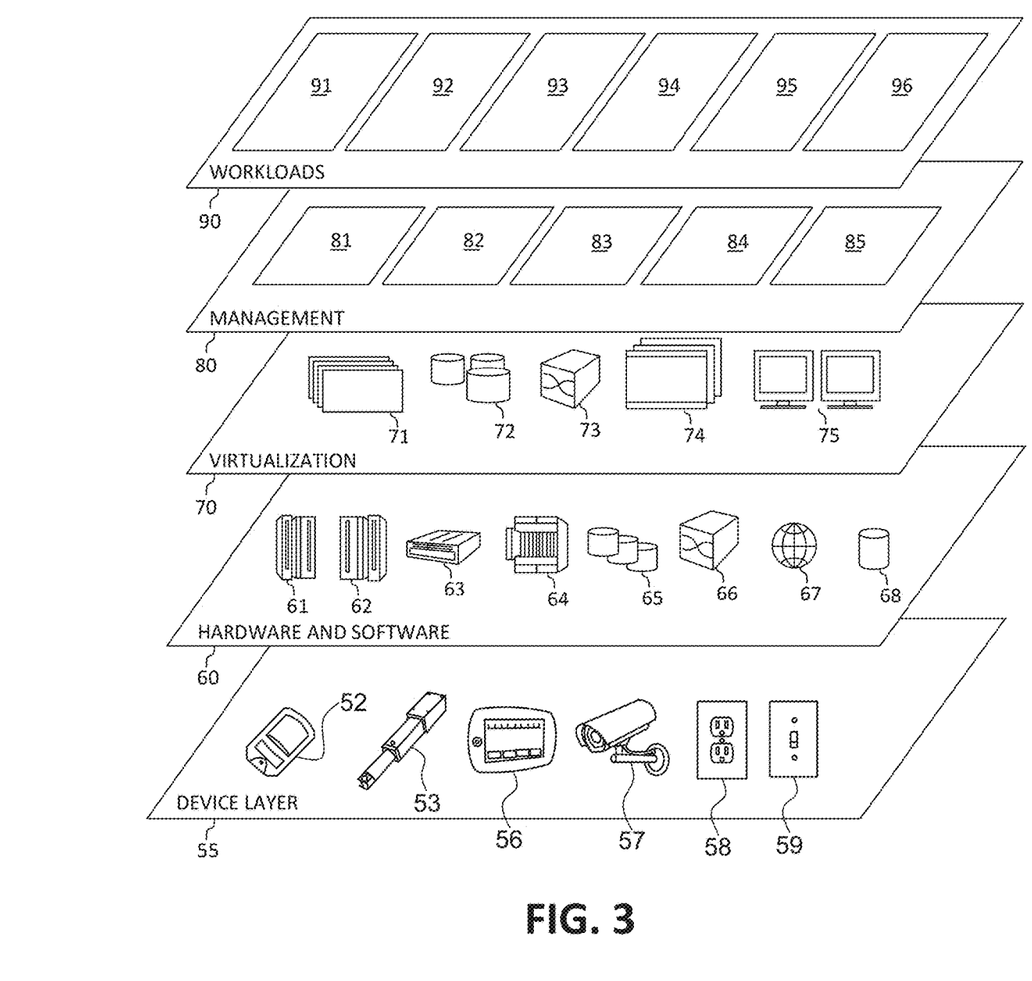
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for controlling media data in a vehicle-to-vehicle communications environment. In addition, workloads and functions 96 for controlling media data may include such operations as data analysis (including data collection and processing from various environmental sensors), collaborative data analysis, and predictive data analytics functions. One of ordinary skill in the art will appreciate that the workloads and functions 96 for controlling media data may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
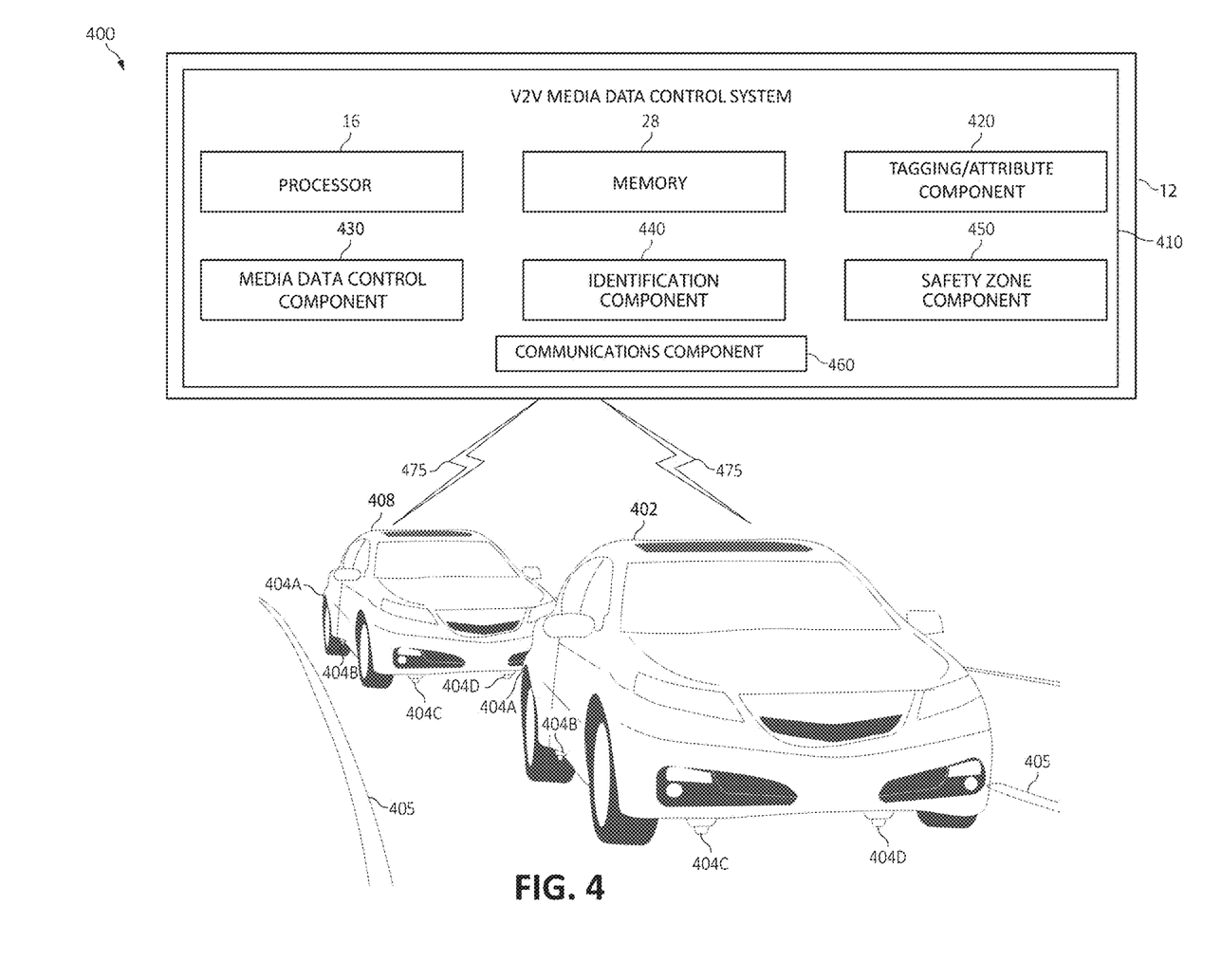
FIG. 4 is an additional block diagram depicting various user hardware and computing components functioning in accordance with aspects of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4.

For example, computer system/server 12 of FIG. 1 (e.g., a cognitive system) may be included in FIG. 4 and may be connected to other computing nodes (such as computer systems of vehicles) over a distributed computing network, where additional data collection, processing, analytics, and other functionality may be realized. The computer system/server 12 of FIG. 1, may include a vehicle-to-vehicle ("V2V") media data control system 410, along with other related components in order to analyze, send, receive, process, and control media data (e.g., images, videos, etc.).

In one embodiment, the V2V media data control system 410 may be in communication via network or communication link 475 with one or more vehicles such as, for example, vehicle 402 and 408. In one aspect, the V2V media data control system 410 may be an independent computing service provided by one or more computing systems and servers (not show for illustrative convenience but may be included in one or more components, modules, services, applications, and/or functions of FIGS. 1-4) and external to the vehicles 402 and 408. In an additional embodiment, the V2V media data control system 410 may be located and locally installed within one or more vehicles such as, for example, vehicles 402 and 408. Vehicles 402 and 408 may be associated with the V2V media data control system 410 via one or more pre-authorization operations and/or may be instantaneously joined to the V2V media data control system 410 via a series of authentication operations to join and grant permission to the V2V media data control system 410 (which may function as a vehicular collaboration system) to gain accesses to one or more IoT devices and/or computing systems of vehicles 402 and 408 for controlling the sharing of media data.

More specifically, the V2V media data control system 410 may incorporate processing unit 16 ("processor") and memory 28 of FIG. 1, for example, to perform various computational, data processing and other functionality in accordance with various aspects of the present invention. The V2V media data control system 410 may also include a tagging/attribute component 420, media data control component 430, identification component 440, safety zone component 450, and a communications component 460, each of which may be controlled and in communication with processing unit 16 and memory 28.

Each vehicle 402 and 408 may have installed thereon one or more internet of things (IoT) devices, such as cameras and sensor based devices such as, for example, devices 404A-D to gather media data surrounding the vehicle or nearby vehicles, such as images, motions, sounds, or other environmental data. Each devices 404A-D may record one or more of the following attributes 1) camera angle, 2) camera direction, 3) field of view "FOV", 4) distance to nearest object (to determine obstructions or obstacles), 5) a maximum time allowed to access the media data (e.g., attribute to determine how much time (e.g., seconds, minutes) a video is allowed in order to conserve battery), and/or 6) a source location (e.g., global positing satellite "GPS" coordinates.).

One or more of the devices 404A-D may capture one or more visible and/or non-visible areas of one or more vehicles from the one or more devices 404A-D mounted to each of the vehicles 402 and 408. Each of the captured images/videos may be included in a collaboration of images/video, provided as live streamed data, and/or provided for on-demand access.

In general, the V2V media data control system 410 may receive a collaboration of media data (e.g., images, videos, data, sounds, signals, and/or a combination thereof) capturing one or more visible and/or non-visible areas to an occupant of a vehicle or other vehicles, such as target vehicle 402, from one or more devices 404A-D located on each one of a plurality of collaborative vehicles, such as vehicles 408, in substantially close proximity to the target vehicle 402.

The various cameras and sensors, such as devices 404A-D, associated with the vehicle 402 or 408, may monitor the vehicle 402 or 408 over a selected time period (e.g., in real time) upon activation of the V2V media data control system 410. Certain data may be obtained from the respective cameras and sensor devices 404A-D, such as one or more areas that may be visible and/or non-visible to an occupant (e.g., driver) of the vehicle 402.

The V2V media data control system 410 may use the communications component 460 to communication with each of the various the vehicles such as, for example, the vehicle 402 or 408. The V2V media data control system 410 may use the communications component 460 to send and/or receive access to the collaborative vehicles.

That is, the communications component 460 may request access to the collaborative vehicles from one vehicle such as, for example, vehicle 402 in substantially close proximity to one or more alternative vehicles, such as vehicle 408, for receiving media data from each imaging or sensing devices associated with the vehicles 402 and/or 408. Each received media data may be included in the collaboration of media data. Upon receiving permission to access the cameras and sensor based devices (e.g., one or more of devices 404A-D) of each of the vehicles 402 and 408 in the V2V media data control system 410, the media data control component 430 may collect, gather, and process the data received from each of the respective cameras and sensor devices (e.g., devices 404A-D) from vehicles 402 and/or 408.

In short, the communications component 460 may receive a request for media data from one or more IoT devices (e.g., device 404A-D) associated with one or more collaborative vehicles such as, for example, vehicles 402 and 408.

The media data control component 430, in association with the communications component 460, may grant approval for accessing the media data according to one or more contextual factors and user selected criteria.

The media data control component 430 may also define, determine, identify and/or learn user selected criteria according to one or more entity categories, and/or define, determine, identify and/or learn one or more policies or rules associated with the user selected criteria included in each of the one or more entity categories. That is, the identification component 440 (and/or in association with the media data control component 430) may define, determine, identify and/or learn one or more rules and/or set "categories" and within each category for approval of sharing media data.

The categories of entities for requesting media data (e.g., a video) may include the following categories. 1) Category 1 may include known and trusted/preapproved users such as, for example, family, friends, and/or social media contacts. 2) Category 2 may include unknown and users associated with a selected association/group that may be trusted/preapproved such as, for example, the user belongs to an association trusted by the party controlling the requested media data. 3) Category 3 may include trusted/preapproved organizations such as, for example, emergency service responders. 4) Category 4 may include unknown users/persons, but the unknown users/persons has requested the video stream for a specific purpose and/or defined period of time.

In one aspect, a relationship rule may be provided whereby one or more rules to indicate whether the provider/controlling party of the media knows the requesting party (e.g., binary rules that indicates the provider/controlling party know the requesting party "yes" or the provider/controlling party does not know the requesting party "no"). In an additional aspect, the relationship rules may indicate whether the provider/controlling party of the media knows the requesting party according to preapproval, a weighted evaluation, and/or a permission score threshold. For example, one or more contextual factors and/or historical data associated with the requesting party may be assigned a weighted value. If the weighted value is greater than a permission score threshold, the requesting party may be indicated as a known party and access to the media data may be granted.

In addition to categories of requesting entities, the media data control component 430, in association with the safety zone component 450, provides that a data stream provider (e.g., vehicle 402 and/or 408) may establish a "safe zone" in which video may not be shared or communicated. The safety zone may be a region, a selected time period, and/or a status of an occupant in which video may not be shared or communicated. For example, an occupant of the vehicle 402 may indicate that unless there are other occupants within a vehicle the video may not be shared or communicated. As an additional example, a safety zone may indicate that unless a father/significant other of a mother with young the video may not be shared or communicated. As an additional example, the safety zone may indicate that during the hours from 10:00 p.m. until 6:00 a.m. the video may not be shared or communicated with other drivers.

The tagging/attribute component 420 may also tag the media data with one or more identifying attributes to identify the media data relating to the request. The media data control component 430 may define one or more permission attributes and a permission score threshold to be including in the user selected criteria for tagging the media data. For example, media data (e.g., a video) may be tagged with attributes the enable identification of which of several video feeds will be requested by a user of the system.

In one aspect, the devices 404A-D may record the attributes/meta data and make the attributes/meta data available as a live broadcast and/or as an entry into a cloud based central system. Users who are desiring the media data (e.g., real time video feeds) to accomplish a task may then determine the video attributes they need and query the system for video feed attributes that match. Then, the media data control component 430 may determine and/or grant approval for accessing the media data to one or more entities which feeds.

The media data control component 430 may grant an approval for accessing the media data to one or more entities, from a plurality of entity categories, having one or more attributes matching the one or more permission attributes, a permission score above the permission score threshold, or a combination thereof. The media data control component 430 may grant the approval for accessing the media data according to a defined relationship in a social media network, one or more relationships or associations between a sender of the request and one or more recipients of the request, or a combination thereof. The media data control component 430 may grant the approval for accessing the media data according to a trusted source, an identified purpose, an emergency services provider, or a combination thereof. Also, the safety zone component 450 may establish one or more safety zones for restricting accessing to the media data.

In one aspect, provider/controlling party of the media information (e.g., via media data control component 430) may also control one or more aspects of the sharing. For example, the provider/controlling party of the media information may indicate a length of time for sharing the media information, a time duration of the media, a time of day for sharing, a defined distance from the vehicle of the provider/controlling party of the media information such that vehicles outside the defined distance are restricted from gaining access, and/or a ranked order for providing access to the media data for selected entities having priorities over other potential candidates. For example, if a family member is currently receiving a video feed of provider/controlling party of the media information and an emergency service provider is approaching the provider/controlling party of the media information, the provider/controlling party of the media information may restrict/terminate the sharing of the media information and share the video feed with the emergency service provider.

With the foregoing functional components 400 in view, consider some of the various aspects of the illustrated embodiments. In one aspect, the media data control component 430 may provide one or more phases for controlling media data information in the V2V media data control system 410.

In a preparation phase, the provider/controlling party (e.g., vehicle 402) of the video stream may define one or more sharing control rules, criteria, and/or categories. Also, in the preparation phase, for an individual that the provider/controlling party of the media data knows or recognizes such as, for example, contacts having a social media relationship in a social media network, one or more user attribute(s) may be received from the contacts to authorize sharing of the media data. Without the user attribute (e.g., a permission attribute), the contact is unable to receive authorization for receiving the media data. For each relationship type for "known individuals" (e.g., category 1 and 3), a list of attributes may be received to determine sharing and the attribute value.

Alternatively, in the preparation phase, for an unknown individual/entity of the provider/controlling party of the media (e.g., category 2 or 4), the unknown individual/entity may provide to the provider/controlling party of the media information indicating association and/or membership to a trusted/approved association, organization and/or group to authorize sharing of the media data.

In one aspect, based on the preparation phrase, the evaluation and approval for permission for receiving the media data may occur in real-time for immediate access to the media data/video stream. For example, a request from a trust party (e.g., family member in category 1) may send the request and immediately be approved for access to the video stream of the controlling party. In one aspect, if the requesting party is unable to be verified, an interactive query (e.g., using one or more IoT device associated with each user and/or vehicle) may be initiated between the requesting party and the provider/controlling party of the video stream to assist in providing or rejecting access to the media data.

Next, in a usage phase, the provider/controlling party of the video stream (e.g., vehicle 402) may receive a sharing request from another vehicle via the V2V media data control system 410 (e.g., a request from vehicle 408). The media control component 430 (on behalf of the provider/controlling party of the video stream) may evaluate each request and determine if sharing is appropriate via the sharing control rules, criteria, and/or categories. That is, the media control component 430 may identify a relationship, match a type media data usage, and/or match identities established in the preparation phase for determining approval and/or disapproval of the media data according to the sharing control rules, criteria, and/or categories. In one aspect, provider/controlling party of the video stream (e.g., vehicle 402) may adjust, modify, and/or override any decision of the media control component 430. Additionally, the media control component 430 (on behalf of the provider/controlling party of the video stream) may match the identity and/or permission attribute to grant approval for sharing the media data.

To further illustrate the foregoing functional components 400 in view, consider some of the various aspects of the illustrated embodiments according to the following pseudo-code.

Preparation Phase:—Known Entities
for each social media relationship,
   receive from user
      if social media should be considered then
         receive individual user attribute(s) which must exist or not exist to determine shareability
end
For each "friend" relationship
   receive from user list of attributes to determine sharing and the attribute value.
Preparation Phase—Unknown Entities
For each "interest" association (e.g., AAA, IEEE, etc.)
   receive from user if members of the "interest" association can be shared. For each "usage" (e.g., impaired visibility—see around the next vehicle, determine if there is an empty parking space, observe one or more vehicles (including the vehicle of the requestor)) receive from user acceptable usage types for sharing & length of time for sharing.
Preparation Phase—Organization
For each "organization" (e.g., police, first responders, product manufactures) receive from user if organization can be shared.
Preparation Phase—General Restrictions
For all entities which may be shared with
   receive from user sharing restrictions, (e.g., not within 1 mile of defined location, not at night, not if occupant is alone in the vehicle, etc.).
Usage Phase
If request received to share vehicle information, then
   if request is based on social relationship, then
      if requestor identity and attributes match those established in preparation phase/credential then
         if user sharing restrictions not violated, then share my vehicle information else
   if request is from "friend", then
      if requestor identity is sharable, then
         if user sharing restrictions not violated, then share vehicle information else if request is from "interest" association then
            if association identity matches these established in preparation phase then
               if user sharing restrictions not violated, then share vehicle information else
   if request if from organization then
      if organization identity matches these established in preparation phase then
         if user sharing restrictions not violated, then share my vehicle information else
   if request is for usage type then
      if usage type matches these established in preparation phase then
         if user sharing restrictions not violated, then share vehicle information.
Weighted Rule Operation
   Preparation Phase:—Known Entities
for each social media relationship,
   receive from user
      if social media should be considered then
         receive individual user attribute(s) which must exist or not exist to determine shareability,
      end if
   end for.
For each "friend" relationship
   receive from user list of attributes to determine sharing and the attribute value for each attribute receive from user an "importance score" for that attribute end for.
Preparation Phase—Unknown Entities
For each "interest" association (e.g., AAA, IEEE, etc.)
   receive from user if members of the "interest" association can be shared
   if "interest organization can be shared, then
   receive from user an "importance score" for that organization.
   For each "usage" (e.g., type of usage such as, for example, impaired visibility—see around the next vehicle, determine if there is an empty parking space, observe one or more vehicles (including the vehicle of the requestor)),
      receive from user acceptable usage types for sharing and length of time for sharing for each acceptable usage type,
      receive from user an "importance score" for that type.
Preparation Phase—Organization
For each "organization" (e.g., police, first responders, product manufactures)
   receive from user if organization can be shared.
for each organization
   receive from user an "importance score" for that organization
Preparation Phase—General Restrictions
For all entities which may be shared with,
   receive from user sharing restrictions, (e.g., not within 1 mile of defined location, not at night, not if occupant is alone in the vehicle, etc.)
for each sharing restriction,
   receive from use an "importance score" for not sharing (e.g., a negative score)
   receive from user the min_score_to_share value
   if the aggregated weighting is more than this value, share, if it is not, then don't share.
Usage Phase
If request received to share vehicle information, then
   if request is based on social relationship, then
      if requestor identity and attributes match those established in preparation phase/credential then calculate an "aggregated importance score"
   if request is from "friend", then
      if requestor identity is sharable, then calculate an "aggregated importance score" if request is from "interest" association then
         if association identity matches these established in preparation phase then calculate an "aggregated importance score"
   if request if from organization then
      if organization identity matches these established in preparation phase then calculate an "aggregated importance score"
   if request is for usage type then
      if usage type matches these established in preparation phase then calculate an "aggregated importance score"
   if user sharing restrictions violated, then calculate an "aggregated importance score"
   If "aggregated importance score">min_score_to_share then share vehicle information.

Figure 5:
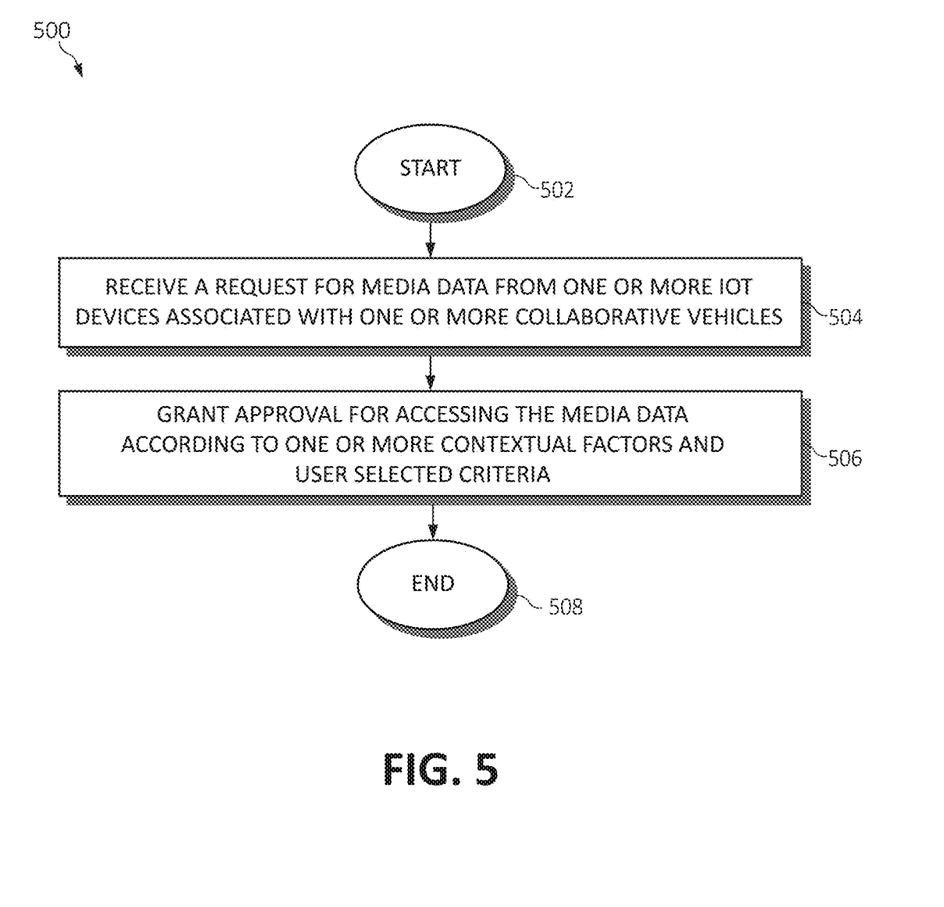
FIG. 5 is a flowchart diagram of an exemplary method for a controlling media data information in a vehicle-to-vehicle computing environment by a processor, in which various aspects of the present invention may be realized.

Turning now to FIG. 5, a method 500 for FIG. 5 is a flowchart diagram of an exemplary method for a controlling media data information in a vehicle-to-vehicle computing environment by a processor, in which various aspects of the present invention may be realized by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502.

A request may be issued for media data from one or more IoT devices associated with one or more collaborative vehicles, as in block 504. Approval for accessing the media data may be granted according to one or more contextual factors and user selected criteria, as in block 506. The functionality 500 may end, as in block 508.

Figure 6:
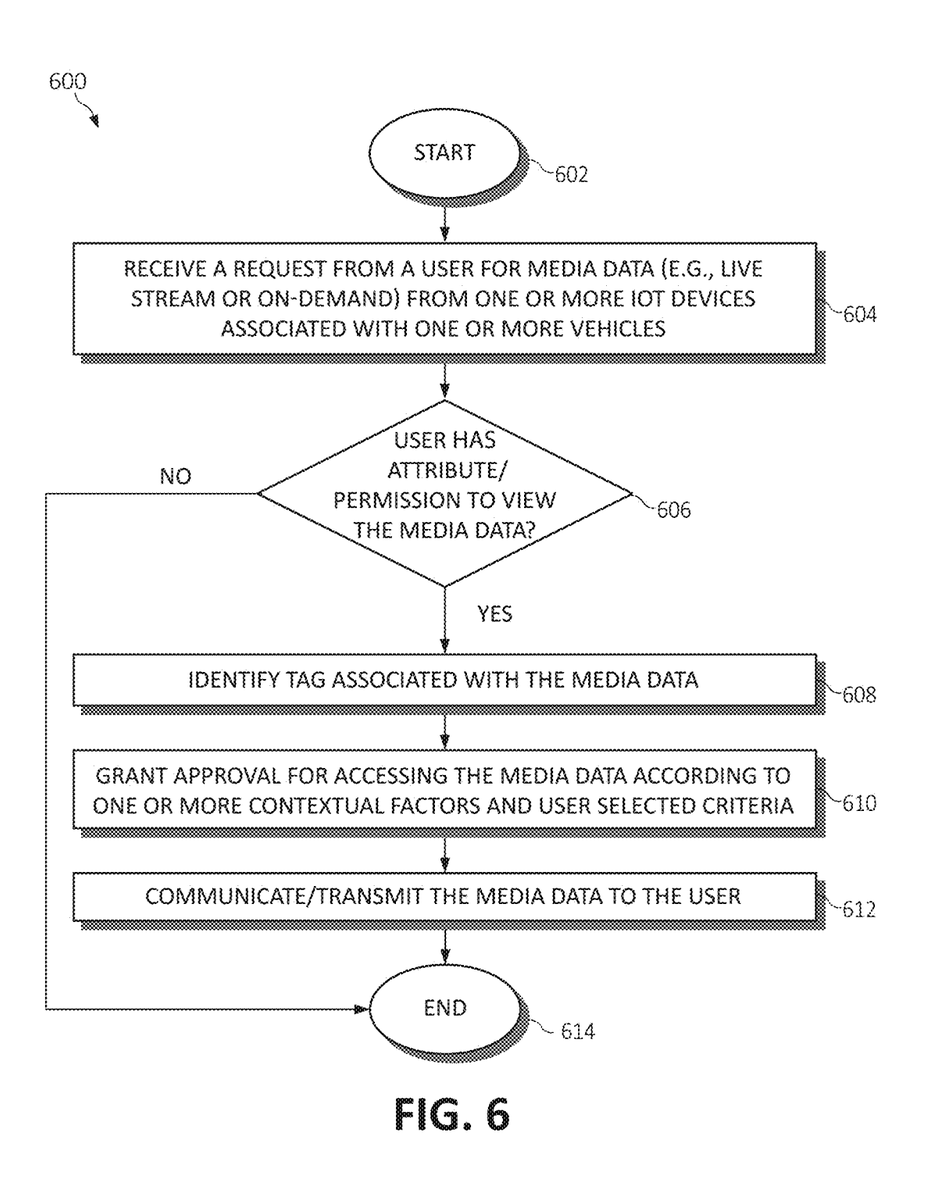
FIG. 6 is an additional flowchart diagram of an exemplary method for a controlling media data information in a vehicle-to-vehicle computing environment by a processor, in which various aspects of the present invention may be realized.

Turning now to FIG. 6, a method 600 for FIG. 6 is a flowchart diagram of an exemplary method for a controlling media data information in a vehicle-to-vehicle computing environment by a processor, in which various aspects of the present invention may be realized by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

A request may be received from a user for media data (e.g., live stream or on-demand) from one or more IOT devices associated with one or more vehicles, as in block 604. The media data may include, for example, images, video data, audio data, sensor based device data, or a combination thereof) capturing visible and/or one or more non-visible areas to an occupant of a vehicle from one or more IoT devices associated with one or more collaborative vehicles in substantially close proximity to the vehicle (e.g., within a defined distance/radius such as, for example, a distance of 1 kilometer, etc.).

An operation may be executed to determine whether the user has an attribute/permission to vie the media data, as in block 606. If the user does not have permission and/or there is no permission attribute, the method 600 may end, as in block 614. If the user does have permission and/or there is a pe ion attribute, a tag associated with the media data may be identified, as in block 608. Approval for accessing the media data may be granted according to one or more contextual factors and user selected criteria, as in block 610. The media data may be communicated/transmitted (e.g., live stream/broadcast) the user, as in block 612. The functionality 600 may end, as in block 614.

In one aspect, in conjunction with and/or as part of at least one block of FIGS. 5 and/or 6, the operations of methods 500 and/or 600 may include each of the following. The operations of methods 500 and/or 600 may define the user selected criteria according to one or more entity categories, and/or define one or more policies or rules associated with the user selected criteria included in each of the one or more entity categories. The media data may be tagged with one or more identifying attributes to identify the media data relating to the request. One or more safety zones for restricting accessing to the media data may also be defined and/or established.

The operations of methods 500 and/or 600 may define one or more permission attributes and a permission score threshold to be including in the user selected criteria. The operations of methods 500 and/or 600 may 1) grant the approval for accessing the media data to one or more entities, from a plurality of entity categories, having one or more attributes matching the one or more permission attributes, a permission score above the permission score threshold, or a combination thereof, 2) grant the approval for accessing the media data according to a defined relationship in a social media network, one or more relationships or associations between a sender of the request and one or more recipients of the request, or a combination thereof, and/or 3) grant the approval for accessing the media data according to a trusted source, an identified purpose, an emergency services provider, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for controlling information in an internet of things (IoT) computing environment, comprising:

receiving a request for media data from one or more IoT devices associated with one or more collaborative vehicles;

granting approval for accessing the media data according to one or more contextual factors and user selected criteria; and establishing one or more safety zones that restrict access to the media data, wherein the one or more safety zones comprise certain ones of the IoT devices residing within a particular region of one of the one or more collaborative vehicles, a selected time period, a status of an occupant of the one or more collaborative vehicles, or a combination thereof.

2. The method of claim 1, further including:

defining the user selected criteria according to one or more entity categories; and defining one or more policies or rules associated with the user selected criteria included in each of the one or more entity categories.

3. The method of claim 1, further including tagging the media data with one or more identifying attributes to identify the media data relating to the request.

4. The method of claim 1, further including defining one or more permission attributes and a permission score threshold to be included in the user selected criteria.

5. The method of claim 4, further including:

granting the approval for accessing the media data to one or more entities, from a plurality of entity categories, having one or more attributes matching the one or more permission attributes, a permission score above the permission score threshold, or a combination thereof; or granting the approval for accessing the media data according to a defined relationship in a social media network, one or more relationships or associations between a sender of the request and one or more recipients of the request, or a combination thereof.

6. The method of claim 1, further including granting the approval for accessing the media data according to a trusted source, an identified purpose, an emergency services provider, or a combination thereof.

7. A system for controlling information in an internet of things (IoT) computing environment, comprising:

one or more computers with executable instructions that when executed cause the system to:

receive a request for media data from one or more IoT devices associated with one or more collaborative vehicles;

grant approval for accessing the media data according to one or more contextual factors and user selected criteria; and establish one or more safety zones that restrict access to the media data, wherein the one or more safety zones comprise certain ones of the IoT devices residing within a particular region of one of the one or more collaborative vehicles, a selected time period, a status of an occupant of the one or more collaborative vehicles, or a combination thereof.

8. The system of claim 7, wherein the executable instructions further:

define the user selected criteria according to one or more entity categories; and define one or more policies or rules associated with the user selected criteria included in each of the one or more entity categories.

9. The system of claim 7, wherein the executable instructions further tag the media data with one or more identifying attributes to identify the media data relating to the request.

10. The system of claim 7, wherein the executable instructions further define one or more permission attributes and a permission score threshold to be included in the user selected criteria.

11. The system of claim 10, wherein the executable instructions further:
grant the approval for accessing the media data to one or more entities, from a plurality of entity categories, having one or more attributes matching the one or more permission attributes, a permission score above the permission score threshold, or a combination thereof; or
grant the approval for accessing the media data according to a defined relationship in a social media network, one or more relationships or associations between a sender of the request and one or more recipients of the request, or a combination thereof.

12. The system of claim 7, wherein the executable instructions further grant the approval for accessing the media data according to a trusted source, an identified purpose, an emergency services provider, or a combination thereof.

13. A computer program product for controlling information in an internet of things (IoT) computing environment by a processor, the computer program product comprising a non-transitory computer-readable storage medium having computer-readable program code portions stored therein, the computer-readable program code portions, when executed, causing the processor to perform operations comprising:
receiving a request for media data from one or more IoT devices associated with one or more collaborative vehicles;
granting approval for accessing the media data according to one or more contextual factors and user selected criteria; and
establishing one or more safety zones that restrict access to the media data, wherein the one or more safety zones comprise certain ones of the IoT devices residing within a particular region of one of the one or more collaborative vehicles, a selected time period, a status of an occupant of the one or more collaborative vehicles, or a combination thereof.

14. The computer program product of claim 13, wherein the operations further comprise:
defining the user selected criteria according to one or more entity categories; and
defining one or more policies or rules associated with the user selected criteria included in each of the one or more entity categories.

15. The computer program product of claim 13, wherein the operations further comprise tagging the media data with one or more identifying attributes to identify the media data relating to the request.

16. The computer program product of claim 13, wherein the operations further comprise defining one or more permission attributes and a permission score threshold to be included in the user selected criteria.

17. The computer program product of claim 13, wherein the operations further comprise:
granting the approval for accessing the media data to one or more entities, from a plurality of entity categories, having one or more attributes matching the one or more permission attributes, a permission score above a permission score threshold, or a combination thereof;
granting the approval for accessing the media data according to a defined relationship in a social media network, one or more relationships or associations between a sender of the request and one or more recipients of the request, or a combination thereof; or
granting the approval for accessing the media data according to a trusted source, an identified purpose, an emergency services provider, or a combination thereof.

* * * * *